May 21, 1940.  W. F. A. BUEHNER  2,201,519
AUTOMOBILE LICENSE PLATE LOCK
Filed Feb. 18, 1939
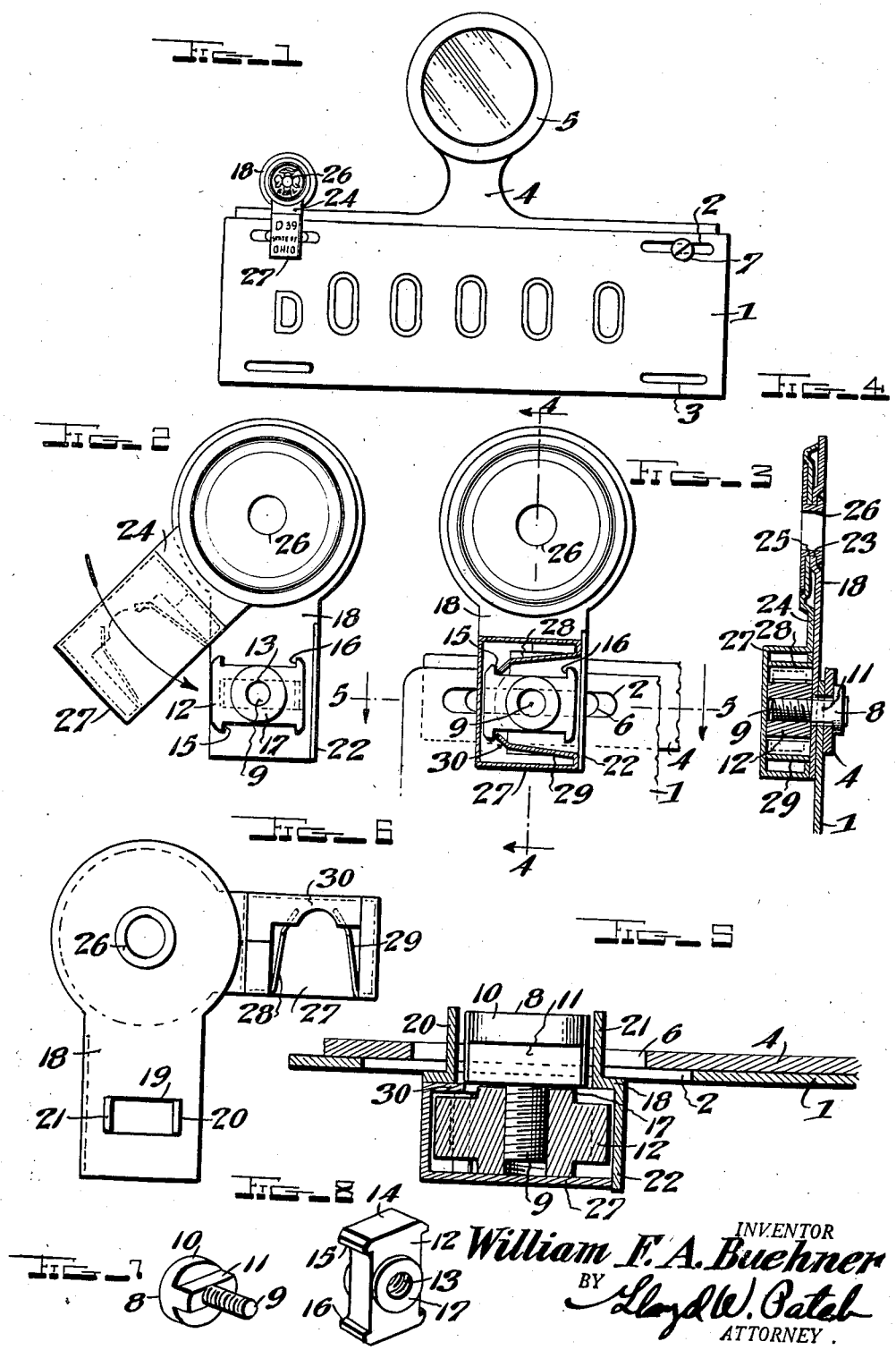
INVENTOR
*William F. A. Buehner*
BY
*Lloyd W. Patel*
ATTORNEY.

Patented May 21, 1940

2,201,519

UNITED STATES PATENT OFFICE 2,201,519

AUTOMOBILE LICENSE PLATE LOCK

William F. A. Buehner, New York, N. Y.

Application February 18, 1939, Serial No. 257,260

5 Claims. (Cl. 40—125)

This invention relates to automobile license plate locks, and particularly to a holder and lock device intended and adapted for application to and use with the ordinary license plate bracket of an automobile and an ordinary or usual form and type of license plate.

An object of this invention is to provide a license plate holder and lock that can be readily and conveniently used with ordinary license plates and the license plate brackets of automobiles, to hold and lock the license plate or tag upon the bracket in such manner as to prevent unauthorized interchangement of license plates from one machine to another, and to thus insure the use and display of a license plate or tag only upon the particular automobile or vehicle to which the license extends.

A further object is to so construct the parts that the holder and lock structure present parts overlying or immediately adjacent to the license plate or tag, thereby permitting display upon this device of a state seal, information as to the state of issue or the date, or any other matter that it may be desired to have visible in substantially the same field of view with the license tag or plate.

Another purpose of my invention is to provide means of this character, capable of use with a license plate or tag mounted upon the front or rear of an automobile, which device will lock the tag in place against accidental or casual displacement or loss, and will at the same time positively retain the plate against being removed, except by irreplaceable breaking or defacing of the lock means, to thus immediately give visible evidence or tampering with or any attempted improper use of the plate or tag, should the license plate locking and holder device be reapplied.

Still another purpose is to so construct the parts that the license plate lock or holder can be cheaply manufactured, and can be sold or passed out along with the license plate as issued, and can then be immediately applied by the individual user, without the necessity or requirement for the use of special sealing or other tools or equipment.

With the above and other objects and purposes in view, some of which will be apparent to those skilled in the art, and others of which are inherent in the construction and use of the parts, my invention includes certain novel features of construction and combinations and arrangements of parts, which will be hereinafter set forth in connection with the drawing and then pointed out in the claims.

In the drawing:

Figure 1 is a view in front elevation illustrating an automobile license tag as secured upon the mounting bracket of an automobile, and with my present invention applied thereto.

Fig. 2 is a view in front elevation of my license plate lock, with the parts illustrated in the unlocked position.

Fig. 3 is a fragmentary view in front elevation of a license plate and mounting bracket having my invention applied thereto, and with the forward side of the lock case sectionally removed to better illustrate the construction and position of the parts.

Fig. 4 is a vertical sectional view taken substantially on line 4—4 of Fig. 3.

Fig. 5 is an enlarged sectional view taken horizontally substantially on line 5—5 of Fig. 3.

Fig. 6 is a reversed elevational view somewhat similar to Fig. 2 showing the parts as they appear when viewed from the back.

Fig. 7 is a perspective view to better show the locking bolt.

Fig. 8 is a view in perspective illustrating the locking nut.

As shown in Figure 1, the license plate or tag 1 is of ordinary or usual construction, and is provided with elongated openings 2 and 3, adjacent to its upper and lower edges, to receive fastenings by which the plate or tag is held upon the mounting bracket of an automobile. In the present disclosure I have illustrated the bracket 4 as a rear bracket, with the usual tail light 5 indicated at 6, but it will of course be understood that the present showing is only intended as illustrative, and that my invention is applicable to and can be used for locking license plates or tags upon the forward or rear mounting brackets of automobiles; and, with equal facility and effectiveness, for locking a tag whether fitted upon the mounting bracket to depend therefrom, or to extend upwardly above the bracket.

As shown in Figs. 1, 3 and 5, the mounting bracket 4 has elongated openings 6 therein to receive fastenings by which the plate is mounted in place, and at one end the usual screw or bolt 7 can be provided and can be fitted to secure the one end of the tag upon the bracket.

A locking and clamp bolt 8 has the threaded shank 9 thereof made of a size to fit readily through the opening 6 of the bracket and one of the slotted openings, 2 or 3, of the plate 1, and adjacent to its head 10, this bolt is provided with a rib-like extension 11, which will fit within the openings 6 and 2, to thus hold the bolt 8 against being revolved. A locking nut 12 is provided with a screw threaded opening 13 to receive the screw threaded shank 9 of the mounting and locking bolt 8, and this locking nut has extension ends 14 thereof provided with laterally and oppositely extending locking shoulders 15 and 16. On one or both of its faces, the locking nut is provided with shoulder 17, surrounding the screw threaded opening 13. While the outer contour of the locking nut 12 is somewhat varied from ordinary or standard form, the shape is nevertheless such that the nut can be readily grasped with a wrench or a pair of pliers to turn the nut onto the threaded shank 9 and tighten the nut thereon.

A supporting and base member 18, which is of somewhat elongated form, has the material thereof cut or slitted and then struck out rearwardly, to provide an opening 19 of sufficient size to receive the shoulder portion 11 of locking screw 8, and the struck out portions or tongues 20 and 21 extend rearwardly so that they will project through the registering slotted openings 2 and 6 of the license plate 1 and mounting bracket 4. This base member 18 has a forwardly extending shoulder flange 22 at one side thereof adjacent the opening 19, and adjacent to its opposite end is provided with a bearing opening 23. A locking case member, generally indicated at 24, and which has a contour somewhat approximating that of the base member 18, is provided with an opening 25 registering with the opening 23, and an eyelet 26, or other suitable bearing member, is fitted through these openings to swingably mount the locking case member 24 on the base member 18. The locking case member 24 has a locking case 27 stamped up or otherwise formed at the swinging end thereof, this locking case 27 being open on one side and being of sufficient size to receive and enclose the locking nut 14. The locking case 27 is provided with spring pawl-like portions 28 and 29 converging inwardly from the open side or edge thereof, and a retaining flange 30 is also provided opposite this open side or edge in position to lie closely adjacent to the base or supporting member 18.

In the use of my improved license plate holder and lock, the supporting base member 18 will be fitted against the front face of the license tag 1, with the lug portions 20 and 21 extending through the aligned openings 2 and 6 of the license plate and the mounting bracket 4. The locking bolt 8 is then fitted from the rear side forwardly through the openings 6 and 2, so that the head thereof bears against the back side of the bracket 4 and rib portion 11 is received in the openings 6, 2 and 19. With the locking case member 24 swung back, substantially as shown in Figs. 2 and 6, the locking nut 12 is turned onto the threaded shank end 9 of the locking bolt, and the shoulder 17 thereof bears and clamps and locks against the outer side of the mounting or supporting base 18, after the manner shown in Fig. 2. The locking case member 24 is then swung downwardly and inwardly, substantially as indicated by the arrow in Fig. 2, and the locking nut 12 is received through the opening in the side or edge of the locking case 27, pressure of the locking nut upon the pawl-like portions 28 and 29 moving these members outwardly or spreading them so that they permit passage of the locking nut 12 into the case 27. As this locking case 27 is brought to the position where it contacts with the guard shoulder or flange 22, the ends of the pawl-like portions 28 and 29 pass beyond the outstanding shoulders 15 or 16, and spring back into place to engage against these shoulders and thus positively hold and lock the member 24 against being swung in opposite direction. At the same time, the flange portion 30 engages behind the locking nut 12 in the space provided by the extension of the shoulder 17, and in this way the locking case member 24, and specifically the locking case portion 27, will be held against outward movement to clear or expose the locking nut 12.

If desired, the locking case 27, or other portions of the member 24, can have state and date or other distinguishing data stamped or printed or otherwise applied or displayed thereon. Further, the pivoting member 26 can have a state seal or other matter impressed or printed or otherwise displayed thereon, to thus officially certify or authenticate the holding and locking device as being from the proper source.

With the device constructed and assembled and used in the manner set forth, the extension lugs 20 and 21 hold the supporting member 18 against being swung or rotated in manner calculated to loosen the locking nut 12, and the rib-like portion 11 positively precludes rotation of the locking screw 8. When the locking case member 24 is swung to the locking position, the opening through which the locking nut 12 enters is closed by the extending shoulder or flange 22, the pawl-like portions 28 and 29 engage behind the shoulders of the locking nut 12 to retain the locking case against being swung reversely to the open position, and the engagement of flange 30 between the extending part of nut 12 and the supporting member 18 prevents forward or rear swinging or movement or distortion of the parts to release the same. Thus, when my improved license plate holder and lock is applied, it cannot be removed or casually loosened, and the parts cannot be released except by force or operations that will distort or destroy portions of the structure to such an extent that such removal will be readily detected. For this reason, the holder and lock structure is well adapted for use not only in preventing loss or theft of a license plate, but also for preventing unauthorized removal and substitution of the plate upon another automobile, without requiring or necessitating sufficient damage to or destruction of the parts to be readily and clearly apparent.

While I have herein shown and described only certain specific embodiments of my invention and have suggested only certain possible modifications, it will be appreciated and apparent that many changes and variations can be made in the form and in the manner of construction and in the arrangement and assembly and association of the parts, without departing from the spirit and scope of my invention.

I claim:

1. An automobile license plate lock for use with a license plate having an elongated fastening receiving opening and a mounting bracket for the license plate provided with a registering opening comprising a supporting member having portions receivable through the registering openings to retain said member against swinging movement and provided with an opening adapted to register with the opening of the license plate, a locking bolt receivable through the openings of said mounting bracket and plate and member and having a rib portion within the opening of the mounting bracket adapted to hold the bolt against rotation, a locking nut adapted to be turned onto said locking bolt against the supporting member, and a locking case swingably carried by said supporting member provided with an opening to receive the locking nut and having portions engageable with the locking nut when said locking case is swung to overlie the supporting member whereby the locking nut is held and guarded against removal.

2. A license plate lock for use with a license plate having an elongated fastening receiving opening and a mounting bracket for the license plate provided with a registering opening comprising a supporting member having an opening therethrough and provided with extending portions receivable in the openings of the bracket and plate to hold said supporting member against swinging movement and to align the opening thereof with the bracket and plate openings, a locking bolt adapted to be fitted through the aligned openings of the bracket and plate and member and having an extending portion receivable in the opening of the bracket for holding the bolt against rotation, a locking nut adapted to be turned onto said locking bolt against the supporting member, a locking case member swingably mounted on said supporting member provided with a locking case having an opening adapted to receive the locking nut when the locking case member is swung to overlie the supporting member, and means within the locking case adapted to engage with the locking nut and retain said locking case against return swinging movement whereby the locking nut is held and guarded against removal.

3. A license plate lock for use with a license plate having an elongated fastening receiving opening and a mounting bracket for the license plate provided with a registering opening comprising a supporting member having an opening therethrough and provided with extending portions receivable in the openings of the bracket and plate to hold said supporting member against swinging movement and to align the opening thereof with the bracket and plate openings, a locking bolt adapted to be fitted through the aligned openings of the bracket and plate and member and having an extending portion receivable in the opening of the bracket for holding the bolt against rotation, a locking nut adapted to be turned onto said locking bolt against the supporting member, a locking case member swingably mounted on said supporting member provided with a locking case having an opening for receiving the lock nut when the locking case member is swung to overlie the supporting member, means within the locking case for engaging with the locking nut and retaining said locking case against return swinging movement whereby the locking nut is held and guarded against removal, said locking nut being provided with a recess on the side adjacent to the supporting member, and means carried by the locking case member engageable in said recess in the locking position to hold the locking case against outward swinging movement to expose the locking nut.

4. A license plate lock for use with a license plate having an elongated fastening receiving opening and a mounting bracket for the license plate provided with a registering opening comprising a supporting member having an opening therethrough and provided with extending portions receivable in the openings of the bracket and plate to hold said supporting member against swinging movement and to align the opening thereof with the bracket and plate openings, a locking bolt adapted to be fitted through the aligned openings of the bracket and plate and member and having an extending portion receivable in the opening of the bracket for holding the bolt against rotation, a locking nut adapted to be turned onto said locking bolt against the supporting member, a locking case member swingably mounted on said supporting member provided with a locking case having an opening adapted to receive the locking nut when the locking case member is swung to overlie the supporting member, means within the locking case adapted to engage with the locking nut and retain said locking case against return swinging movement whereby the locking nut is held and guarded against removal, and a flange extension on said supporting member positioned to close the opening of the locking case when in locking position.

5. A license plate lock for use with a license plate having an elongated fastening receiving opening and a mounting bracket for the license plate provided with a registering opening comprising an elongated supporting member having an opening adjacent to one end thereof and provided with rearwardly projecting extensions receivable in the openings of the license plate and bracket whereby the opening of the supporting member is aligned therewith and the body of the supporting member is disposed in predetermined position with respect to the license plate, a locking bolt adapted to be fitted through the aligned openings of the bracket and plate and member and having an extension receivable in the opening of the bracket for holding said bolt against rotation, a locking nut adapted to be turned onto the end of the locking bolt and having a shoulder adjacent to the supporting member whereby the body of the locking nut is spaced therefrom, a locking case carrying member swingably mounted on the supporting member at a point spaced from the location of the locking nut, a locking case carried by said swingable member having an opening capable of receiving the locking nut when the swingable member is moved to a position overlying the supporting member, said locking nut being provided with locking shoulder portions, pawl-like portions within the locking case engageable with said shoulders when said locking nut is within the opening of the locking case to hold the locking case in nut encasing relation, an extending flange on said supporting member for closing the opening of the locking case, and a flange on the swinging member for engaging behind the body of the locking nut in the recess provided by the shoulder thereon whereby the locking case is held against being swung or displaced outwardly.

WILLIAM F. A. BUEHNER.